United States Patent [19]

Danko

[11] Patent Number: 4,915,353
[45] Date of Patent: Apr. 10, 1990

[54] DIAPHRAGM VALVE

[75] Inventor: Oliver L. Danko, Chesterland, Ohio

[73] Assignee: Nupro Company, Willoughby, Ohio

[21] Appl. No.: 249,386

[22] Filed: Sep. 26, 1988

[51] Int. Cl.⁴ .................. F16K 7/16; F16K 31/50; F16K 43/00
[52] U.S. Cl. .................. 251/331; 137/315; 251/274
[58] Field of Search ............. 137/315; 251/331, 335.2, 251/333, 267, 268, 273

[56] References Cited

U.S. PATENT DOCUMENTS

| | | | |
|---|---|---|---|
| 2,388,989 | 11/1945 | Mueser | 251/331 |
| 3,294,408 | 12/1966 | Smith | 251/335.2 |
| 3,812,398 | 5/1974 | Kozel et al. | 251/331 |
| 4,671,490 | 6/1987 | Kolenc et al. | 251/335.2 |
| 4,687,017 | 8/1987 | Danko et al. | 137/315 |

FOREIGN PATENT DOCUMENTS

| | | | |
|---|---|---|---|
| 795145 | 3/1936 | France | 251/331 |
| 918546 | 2/1947 | France | 251/331 |
| 953843 | 4/1964 | United Kingdom | 251/333 |
| 1564521 | 4/1980 | United Kingdom | 251/331 |

Primary Examiner—George L. Walton
Attorney, Agent, or Firm—Fay, Sharpe, Beall, Fagan, Minnich & McKee

[57] ABSTRACT

A diaphragm valve includes a valve body adapted to receive a replaceable diaphragm subassembly. The subassembly includes a sleeve closely received in the valve body. An actuating stem extends through the sleeve and includes a composite diaphragm welded at one end. An intermediate portion of the stem is threadedly received in a closure ring. The closure ring defines a radial gap with a closing gap to permit adjustment of the stem relative to a valve seat. A peripheral portion of the composite diaphragm is clampingly engaged between the valve body and sleeve. The composite diaphragm includes a metal layer having an elastomer bonded to one face to provide superior sealing and strength properties.

10 Claims, 2 Drawing Sheets

DIAPHRAGM VALVE

BACKGROUND OF THE INVENTION

This invention pertains to the art of fluid valves and more particularly to a diaphragm valve.

The invention is particularly applicable to a diaphragm valve for use in biotechnological applications and will be described with particular reference thereto. However, it will be appreciated that the invention has broader applications and may be advantageously employed in other environments and applications.

Prior diaphragm valves have been deficient in two primary areas, namely, cycle life and ease of maintenance and/or replacement. Cycle life is closely dependent on the strength of the diaphragm, particularly the flexural strength of the diaphragm. Some prior valves have utilized a metallic diaphragm due to its high strength. Other valves have utilized an elastomeric diaphragm due to its superior flexure and sealing properties. Still others have attempted to strengthen elastomeric-type diaphragms through use of a composite diaphragm having elastomers of different strengths.

Even with continued improvements in diaphragm valve designs, overall cycle life is still dependent on the strength of the diaphragm. Oftentimes, the remainder of the valve components still have a substantial useful life but changeover or replacement of the worn component, i.e., the diaphragm, is still necessary. Prior arrangements simply have not adequately addressed the problem of repeated maintenance or replacement. That is, if the valve must be repaired or replaced the various valve components have not been designed to aid in cleaning, replacement, and subsequent reassembly.

SUMMARY OF THE INVENTION

The present invention contemplates a new and improved diaphragm valve that has an increased cycle life and facilitates maintenance and/or replacement.

According to the present invention, a diaphragm valve includes a valve body receiving a diaphragm subassembly therein. The diaphragm is a composite member comprised of a metallic base to which an elastomer is bonded.

According to another aspect of the invention, the diaphragm subassembly includes a sleeve receiving an actuating stem therethrough. The diaphragm is secured adjacent one end of the sleeve and has a central portion welded to the stem. An annular closure ring is received at the opposite end of the sleeve and includes a threaded portion for receiving an intermediate portion of the stem. A cap engages a second end of the sleeve for securing the subassembly to the valve body.

According to another aspect of the invention, a guide member is interposed between the stem and subassembly sleeve to maintain accurate, linear movement of the stem.

A principal advantage of the invention resides in the increased cycle life of the valve due to the composite diaphragm assembly.

Yet another advantage of the invention is found in the ease of cleaning or replacement due to the diaphragm subassembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
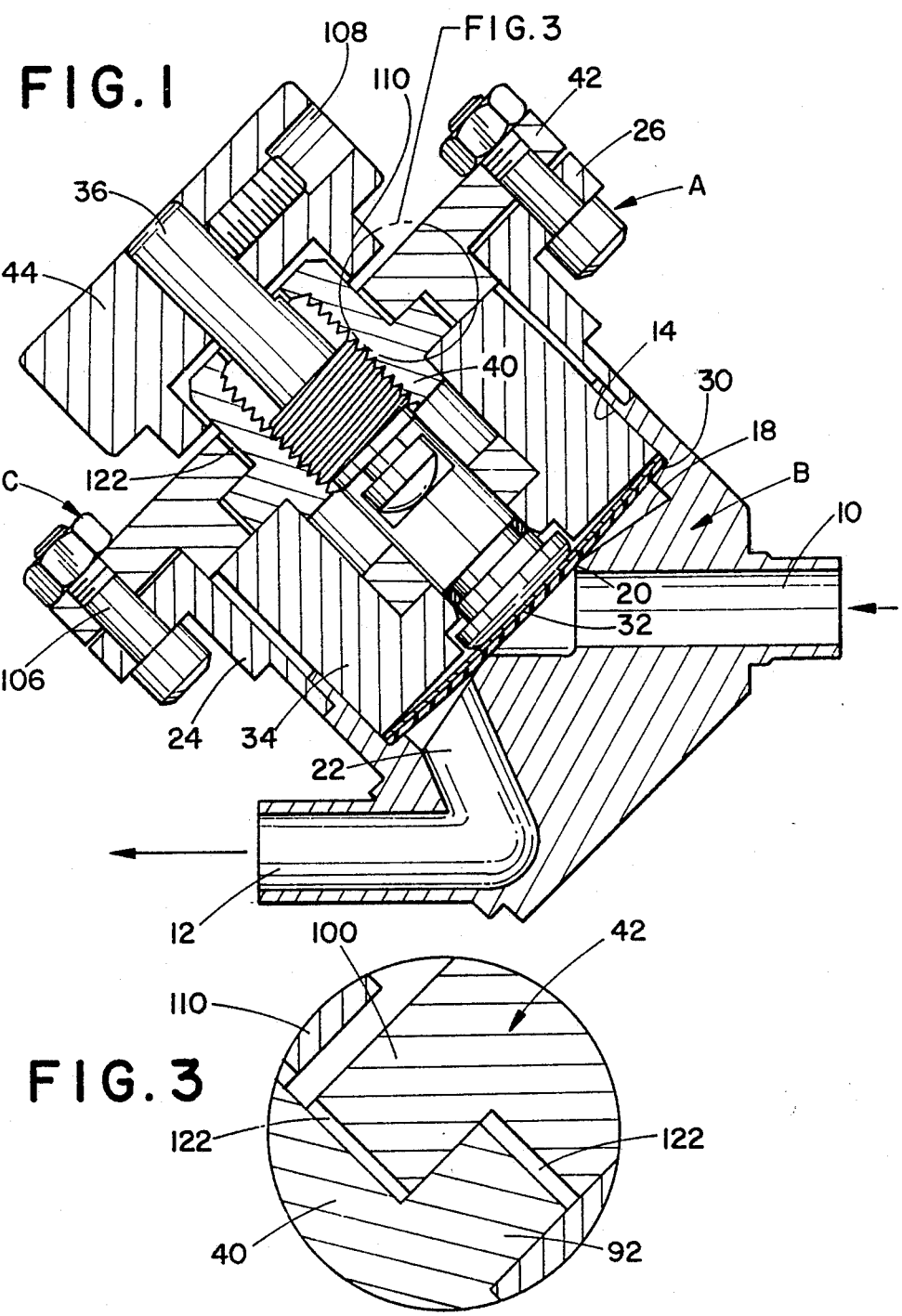
FIG. 1 is a vertical, cross-sectional view of the subject new valve illustrated in a closed position.

Referring now to the drawings wherein the showings are for purposes of illustrating the preferred embodiment of the invention only and not for purposes of limiting same, the FIGURES show a diaphragm valve A having a valve body B that receives a diaphragm subassembly C.

More particularly, the valve body includes an inlet passage 10 and outlet passage 12 that communicate with an enlarged recess 14. As illustrated, the inlet and outlet passages are disposed generally horizontally and communicate with the recess that is angularly disposed relative to a horizontal plane. The intersection of the inlet passage with a bottom wall 18 of the recess defines a valve seat 20. In the preferred arrangement the bottom wall has a tapering configuration such that the valve seat is positioned at a raised central region for reasons which will become more apparent below. The outlet passage is disposed below the inlet passage thus requiring a generally vertically extending, passage portion 22 to interconnect the outlet passage with the recess. Positioning the outlet passage below the inlet passage enhances drainability.

The valve body is a two-part, integral construction comprising a main valve body 24 and a body extension 24'. The body extension includes a generally radially extending, circumferentially continuous flange 26 that assists in valve makeup as will be described further below. The body extension and valve body are typically welded together although it is contemplated that the valve body and body extension may be a unitary cast member as will be understood by one of ordinary skill in the art. A generally radially extending shoulder 30 is defined in the valve body recess. The shoulder is spaced axially outward from the tapering base wall 18 a dimension slightly greater than the valve seat 20 for reasons which will become more apparent below.

With continued reference to FIG. 1, and additional reference to FIG. 2, the diaphragm subassembly C will be described in greater detail. Specifically, the subassembly includes a composite diaphragm 32, a subassembly sleeve 34, two-part actuating stem 36, guide member 38, annular closure ring 40, closure cap 42, and handle or knob 44. The assembly components may be secured together as a unit to facilitate changeover or replacement of a used subassembly.

The composite diaphragm includes a metallic diaphragm 50, preferably stainless steel. A first or upper face 52 of the metallic diaphragm is secured along a central region to the actuating stem 36. For example, the stem and diaphragm may be spot welded together. The second or lower face 54 of the metallic diaphragm is integrally bonded to an elastomeric diaphragm 56. The diaphragm 56 may be formed of EP rubber or similar elastomeric material. The integral bonding of the individual diaphragms provides a composite diaphragm assembly that is greatly increased in strength, yet retains the sealing qualities of an elastomeric member.

The subassembly sleeve 34 has an outer peripheral dimension closely approximating the inner diameter of the valve body recess. This provides for a close fit relationship that aligns and stabilizes the subassembly relative to the valve body. A bore 60 closely receives the actuating stem through the sleeve. On a first or lower end 62 of the sleeve is provided a counterbore 64 that receives an enlarged end of the actuating stem. The radial shoulder defined by the counterbore serves as a valve stop limiting opening movement of the diaphragm valve as will be understood by those skilled in the art. A second counterbore 66 extends axially inward from a second or upper end 68 of the sleeve. The second counterbore closely receives a guide or bushing member 38 therein. The bushing member has an inner diameter substantially identical to that of bore 60 to assure a smooth, linear movement of the actuating stem.

First or lower portion 74 of the actuating stem includes an inverted, generally T-shaped groove 76 that receives a lower end of the second portion 78 of the stem. Particularly, a generally spherical nose 80 of the stem second portion abuttingly engages the stem lower portion to urge the stem and diaphragm to a closed position with the valve seat 20 and without transmitting torque from the handle 44. Radial shoulder 82 defined adjacent the nose portion cooperates with the reduced diameter portion of the T-shaped groove to urge the lower portion of the stem and diaphragm away from the valve seat during valve opening movement.

The stem is externally threaded at 86 for cooperation with an internally threaded region 88 of the closure ring 40. Rotation imparted to the actuator stem advances and retracts the stem relative to the closure ring and sleeve to open and close the valve in a manner well known in the art. The closure ring includes a reduced diameter, axially extending portion 90 adapted for mating receipt in the second counterbore 66 of the housing. This facilitates positive location of the second portion of the stem relative to the stem lower portion 74. Additionally, a radially extending flange 92 is clampingly received between the cap 42 and subassembly sleeve to axially secure the closure ring in the subassembly.

The cap 42 also includes an axially extending portion 98 that abuttingly engages the upper end of the sleeve. A radial inner portion 100 overlies the flange 92 of the closure ring while a radial outer portion 102 cooperates with the body extension flange 26. Means for securing the subassembly to the valve body is defined by a series of fasteners 106 circumferentially arranged around the valve and interconnecting the flanges 26 and 102 of the body extension and cap.

The handle 44 is secured to the upper portion of the stem 36 by means of a set screw 108. This connection ensures that rotation of the handle is effectively transmitted to the actuating stem for reciprocating motion of the diaphragm toward and away from the valve seat 20 as described above. An integral sleeve 110 extends axially downward from the handle for surrounding relation with the closure ring 40. The sleeve 110 serves a protective function limiting dirt and debris from entering the closure ring and interfering with the threaded regions 86, 88.

Figure 2:
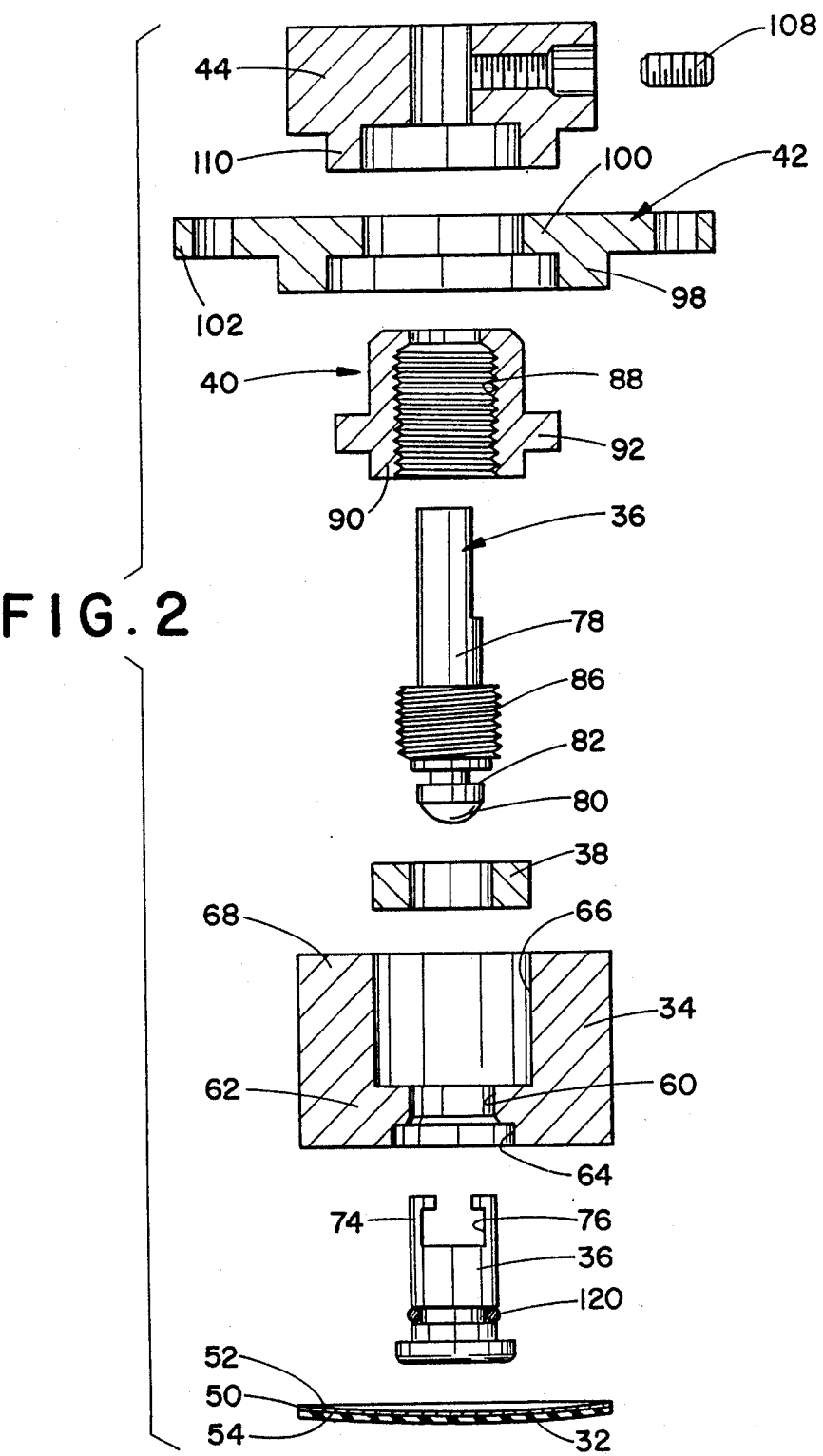
FIG. 2 is a vertical cross-section, exploded view of the diaphragm subassembly; and, FIG. 3 is an enlarged detailed view of the encircled area of FIG. 1 particularly illustrating the adjustment feature of the subject invention.

The subassembly as illustrated in FIG. 2 may be readily inserted into the recess 14 of the valve body. The sleeve 34 and recess shoulder 30 clampingly engage a peripheral portion of the composite diaphragm therebetween. The clamped arrangement defines a primary sealing region of the diaphragm valve. A backup or secondary seal member 120 is interposed between the actuating stem and sleeve. As is apparent, rotation of the handle axially advances or retracts the stem and central portion of the composite diaphragm toward and away from the valve seat. This structural arrangement provides positive diaphragm advancement and positive diaphragm retraction to insure precise open and closed positions.

As described above, the subassembly construction aids in maintenance and replacement of the diaphragm. Specifically, the valve body remains secured to the fluid system and the diaphragm subassembly is easily removed and inserted. Due to tolerance variations, it is important that some play remain in the subassembly to orient movement of the stem relative to the valve seat 20. Preferably, axial movement of the actuating stem will be precisely aligned with the center of the inlet passage so that the composite diaphragm will seat evenly on the valve seat. As is particularly noted in FIG. 3, a radial gap 122 is defined between the closure ring 40 and cap 42. The gap permits slight radial or lateral adjustment of the closure ring prior to final tightening of the fasteners so that the axis of the actuating stem is accurately aligned relative to the valve seat.

The invention has been described with reference to the preferred embodiment. Obviously modifications and alterations will occur to others upon a reading and understanding of this specification. It is intended to include all such modifications and alterations in so far as they come within the scope of the appended claims or the equivalents thereof.

Having thus described the invention, it is now claimed:

1. A diaphragm valve comprising:
   a body having an inlet and outlet operatively communicating across a valve seat defined in an enlarged recess;
   a diaphragm subassembly adapted for selective receipt in said recess, said diaphragm subassembly including
   (i.) a subassembly sleeve adapted for close receipt in said body recess and said sleeve having an opening extending therethrough,
   (ii.) a flexible diaphragm disposed adjacent a first end of said sleeve, said diaphragm being compressed along a peripheral portion between said sleeve and body to define a primary seal,
   (iii.) an actuating stem extending through the opening in said sleeve, a first end of said stem being secured to an interior face of said diaphragm without extending therethrough and selectively actuating said diaphragm to an open position spaced from said valve seat and a closed position engaging said valve seat,
   (iv.) a closure ring received at a second end of said sleeve, said closure ring including a threaded portion adapted to operatively receive an intermediate portion of said actuating stem for advancing and retracting said stem and diaphragm relative to said sleeve, and cap means for securing said diaphragm subassembly to said body, said closure ring having a portion extending into said sleeve and an intermediate radial portion being supported by said sleeve, said cap means having a portion extending into engagement with said sleeve and a radial portion of said cap means being in engagement with said closure ring radial portion, said radial portions defining gaps therebetween to permit radial adjustment of the closure ring prior to final tightening of the cap means so that the axis of the actuating stem is accurately aligned relative to the valve seat.

2. The diaphragm valve as defined in claim 1 wherein said actuating stem includes means for permitting rotation of said stem first end relative to said stem second end.

3. The diaphragm valve as defined in claim 1 further comprising a seal member interposed between the stem and sleeve for providing a backup arrangement to said diaphragm.

4. The diaphragm valve as defined in claim 1 wherein said inlet is disposed above said outlet to enhance drainability of the valve.

5. The diaphragm valve as defined in claim 1 wherein said actuating stem is welded to said diaphragm.

6. The diaphragm valve as defined in claim 1 wherein said diaphragm is a composite structure including an elastomer layer integrally bonded to a metal layer.

7. A diaphragm valve comprising:
   a body having an inlet and outlet operatively communicating across a valve seat defined in an enlarged recess in the body; and,
   a diaphragm subassembly adapted for receipt in said body recess, said subassembly including
   (i.) a sleeve dimensioned for close receipt in said body recess,
   (ii.) a flexible composite diaphragm having a solid, generally circular configuration received adjacent one end of said sleeve and being clampingly engaged along a peripheral portion between said sleeve and body to define a primary seal,
   (iii.) an actuating stem received through said sleeve and having a first end fixedly secured to said diaphragm without extending therethrough, said stem having a first portion adapted for selective, reciprocative movement relative to said sleeve, a second portion adapted for both rotational and reciprocative movement relative to said sleeve, and means interconnecting said stem first and second portion for limiting transfer of torque from said stem first portion to said stem second portion,
   (iv.) a closure ring receiving said stem second portion therethrough, said closure ring including a threaded portion for advancing and retracting said stem,
   (v.) a secondary seal interposed between said stem and sleeve, and
   cap means for securing said diaphragm subassembly to said body, said closure ring having a portion extending into said sleeve and an intermediate radial portion being supported by said sleeve, said cap means having a portion extending into engagement with said sleeve and a radial portion of said cap means being in engagement with said closure ring radial portion, said radial portions defining gaps therebetween to permit radial adjustment of the closure ring prior to final tightening of the cap means so that the axis of the actuating stem is accurately aligned relative to the valve seat.

8. The diaphragm valve as defined in claim 7 wherein said inlet is disposed above said outlet to enhance drainability of the valve.

9. The diaphragm valve as defined in claim 7 wherein said actuating stem is welded to said diaphragm.

10. The diaphragm valve as defined in claim 7 wherein said composite diaphragm includes an elastomer layer integrally bonded to a metal layer.

* * * * *